US011505255B2

(12) United States Patent
Song

(10) Patent No.: US 11,505,255 B2
(45) Date of Patent: Nov. 22, 2022

(54) CENTER PILLAR STRUCTURE

(71) Applicants:Hyundai Motor Company, Seoul (KR); Kia Motors Corporation, Seoul (KR)

(72) Inventor: Won Jung Song, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 17/158,830

(22) Filed: Jan. 26, 2021

(65) Prior Publication Data
US 2022/0041222 A1 Feb. 10, 2022

(30) Foreign Application Priority Data
Aug. 10, 2020 (KR) .................. 10-2020-0100076

(51) Int. Cl.
*B62D 25/04* (2006.01)
*B60J 5/04* (2006.01)
*B60R 21/00* (2006.01)

(52) U.S. Cl.
CPC ............. *B62D 25/04* (2013.01); *B60J 5/043* (2013.01); *B60J 5/0447* (2013.01); *B60R 2021/0006* (2013.01); *B60Y 2200/11* (2013.01)

(58) Field of Classification Search
CPC ................................ B62D 25/04; B60J 5/043
USPC ............. 296/193.06, 187.09, 187.1, 193.05, 296/203.03, 209
See application file for complete search history.

(56) References Cited

U.S. PATENT DOCUMENTS

| | | | | |
|---|---|---|---|---|
| 10,549,785 | B2* | 2/2020 | Lee ........................ | B62D 25/04 |
| 2017/0313358 | A1* | 11/2017 | Narahara ............... | B62D 21/15 |
| 2020/0353991 | A1* | 11/2020 | Sakai ....................... | C21D 1/18 |

* cited by examiner

*Primary Examiner* — D Glenn Dayoan
*Assistant Examiner* — Sunsurraye Westbrook
(74) *Attorney, Agent, or Firm* — Morgan, Lewis & Bockius LLP

(57) ABSTRACT

A center pillar structure may include a center pillar inner upper connected to a side inner, a center pillar inner connected to the center pillar inner upper in up and down directions, a center pillar reinforcement outer connected to a front pillar reinforcement outer and connected to the center pillar inner along the up and down directions, a center pillar reinforcement disposed along the up and down directions on the inner side between the center pillar inner and the center pillar reinforcement outer, and coupled between front/rear flange combined portions of the center pillar inner and the center pillar reinforcement outer, and a seat belt reinforcement shaped corresponding to the center pillar reinforcement, and connected to the center pillar reinforcement to form an inner closed section along the up and down directions.

14 Claims, 7 Drawing Sheets

CENTER PILLAR STRUCTURE

CROSS-REFERENCE TO RELATED APPLICATION

The present application claims priority to Korean Patent Application No. 10-2020-0100076 filed on Aug. 10, 2020, the entire contents of which is incorporated herein for all purposes by this reference.

BACKGROUND OF THE INVENTION

Field of the Invention

The present invention relates to a pillar structure of the vehicle body. More particularly, the present invention relates to a center pillar structure of a vehicle to which a sliding door is applied.

Description of Related Art

In general, a center pillar of the vehicle body is a pillar positioned between a front door and a rear door, and supports the overall strength of the vehicle body in the event of a vehicle collision, and is configured to protect the occupant.

These center pillars have different shapes depending on the type of vehicle. As an example, an upper end portion of the center pillar in sedan and SUV vehicles has a T shape, and robustness may be secured by transferring load in both directions.

As another example, an upper end portion of the center pillar in an MPV vehicle with a sliding door is provided in a "L" shape to avoid interference with a sliding door rail. Since the upper portion of the center pillar of the "L" shape transfers the load in only one direction thereof, it has insufficient robustness, and buckling may occur when the load is transferred in a specific direction thereof, such as a cantilever shape.

Furthermore, in the case of a small overlap collision of a vehicle with the upper portion of the center pillar of the "L" shape, the impact load is concentrated at the upper portion of the center pillar. Accordingly, since the transmission direction of the collision load is sharply bent from the vehicle traveling direction to the vertical direction through the upper end portion of the center pillar, the upper end portion of the center pillar cannot prevent the collision load and may be greatly deformed.

Therefore, to improve the structural limitations as described above, sufficient reinforcement of the upper portion of the center pillar of the "L" shape is required. However, conventionally, due to the welding property of the vehicle body and interference of the sliding rail, there is a situation in which the thickness and material of the steel plate panel are increased without structural reinforcement at the upper end portion of the center pillar.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a center pillar structure configured for securing collision performance and reducing weight by improving the strength and connectivity of the center pillar.

A center pillar structure according to various exemplary embodiments of the present invention may include a center pillar inner upper connected to a side inner, a center pillar inner connected to the center pillar inner upper in up and down directions, a center pillar reinforcement outer connected to a front pillar reinforcement outer and connected to the center pillar inner along the up and down directions, a center pillar reinforcement disposed along the up and down directions on the inner side between the center pillar inner and the center pillar reinforcement outer, and coupled between front/rear flange combined portions of the center pillar inner and the center pillar reinforcement outer, and a seat belt reinforcement shaped corresponding to the center pillar reinforcement, and connected to the center pillar reinforcement to form an inner closed section along the up and down directions.

The inner closed section may include a front welding flange portion in which a front flange of the center pillar reinforcement and a front flange of the seat belt reinforcement are welded to each other along the up and down directions, and a rear welding flange portion in which a rear flange of the center pillar reinforcement and a rear flange of the seat belt reinforcement are welded to each other along the up and down directions.

The center pillar reinforcement may include flange ribs formed to be integrally protruded by being separated from the front flange of the center pillar reinforcement and the rear flange of the center pillar reinforcement in the up and down directions, and joined between the center pillar inner and the front/rear flange combined portion of the center pillar reinforcement outer.

A rear end portion of the side inner may be welded with the front welding flange portion of the upper end portion of the inner closed section.

A rear end portion of the side inner may be welded with the front flange of the seat belt reinforcement.

The center pillar inner upper may be welded in front of a welding portion of the side inner and the front welding flange portion.

The center pillar reinforcement outer may be welded to the rear welding flange portion at the upper end portion of the inner closed section.

The center pillar reinforcement outer may be welded to the rear flange of the center pillar reinforcement through a connection flange of the center pillar reinforcement outer so that the inner closed section is provided inside the center pillar reinforcement outer.

The center pillar reinforcement outer and the side inner form a closed section including the inner closed section.

An upper portion of the center pillar reinforcement outer may be welded to a rear end portion of the front pillar reinforcement outer through a "L" shape connection end portion.

The center pillar structure may further include a center pillar reinforcement upper connected to the upper portion of the center pillar reinforcement and coupled with the center pillar inner upper.

Various exemplary embodiments of the present invention may improve the impact performance by reinforcing the strength and reducing deformation of the center pillar according to the small overlap collision of the vehicle.

Furthermore, the effect obtained or predicted by various exemplary embodiments of the present invention will be included directly or implicitly in the detailed description of various exemplary embodiments of the present invention.

That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

Since these drawings are for reference only to explain various exemplary embodiments of the present invention, the technical idea of the present invention may not be interpreted as being limited to the accompanying drawing.

Figure 1:
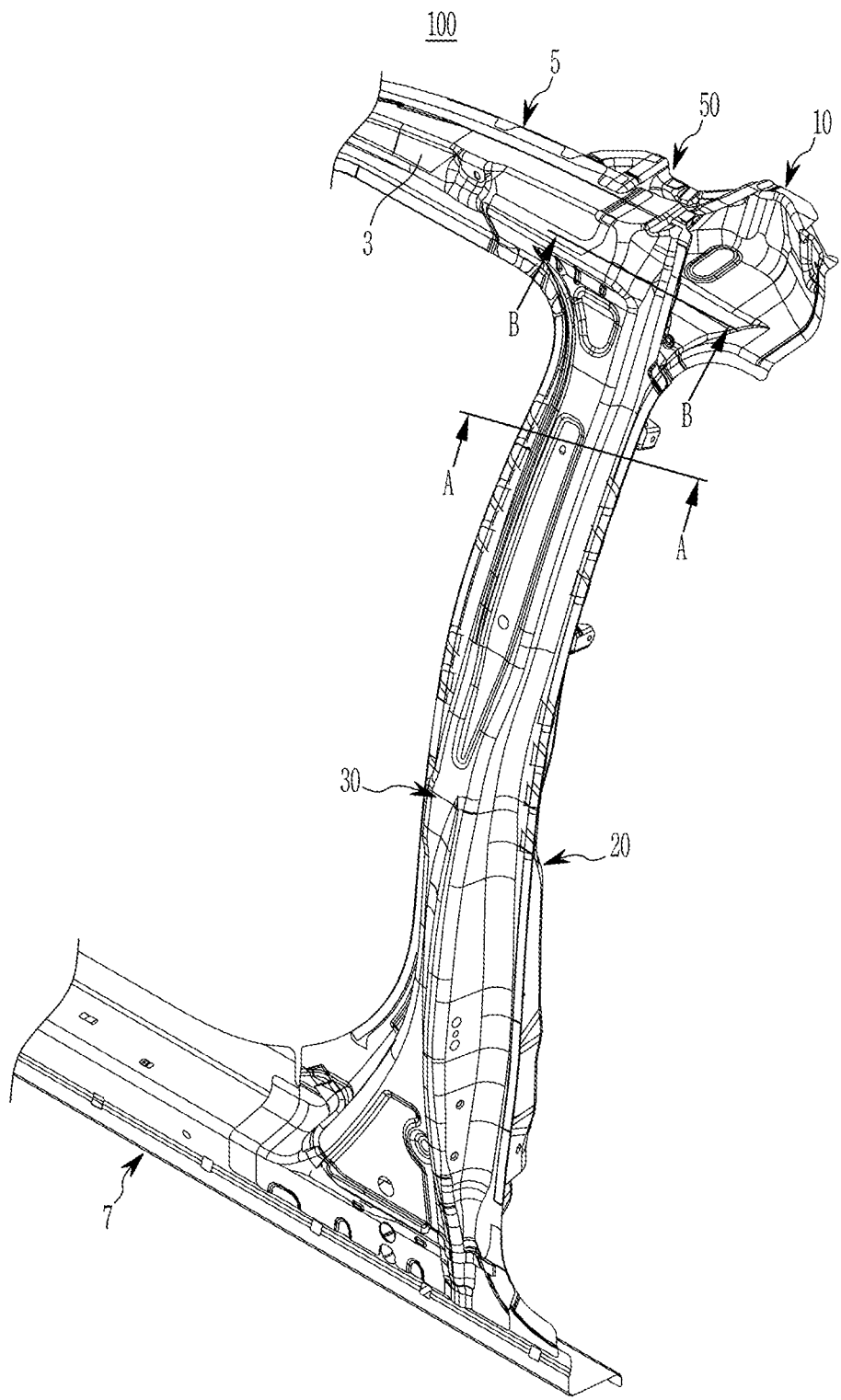
FIG. 1 is a perspective view showing a center pillar structure according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clearly describe the present invention, parts irrelevant to the description are omitted, and the same reference numerals are assigned to the same or similar components throughout the specification.

Since the size and thickness of each component shown in the drawings are arbitrarily shown for convenience of description, the present invention is not necessarily limited to those shown in the drawings, and the thickness is enlarged to clearly express various parts and regions.

Furthermore, in the following detailed description, the name of the configuration is divided into first, second, etc. To distinguish the configuration by the same relationship, and in the following description, the order is not necessarily limited.

In the entire specification, when a certain portion includes a certain constituent element, this means that other constituent elements may be further included rather than excluding other constituent elements unless otherwise specified.

Furthermore, terms such as unit means, etc. described in the specification mean a unit of a comprehensive configuration that performs at least one function or operation.

Figure 2:
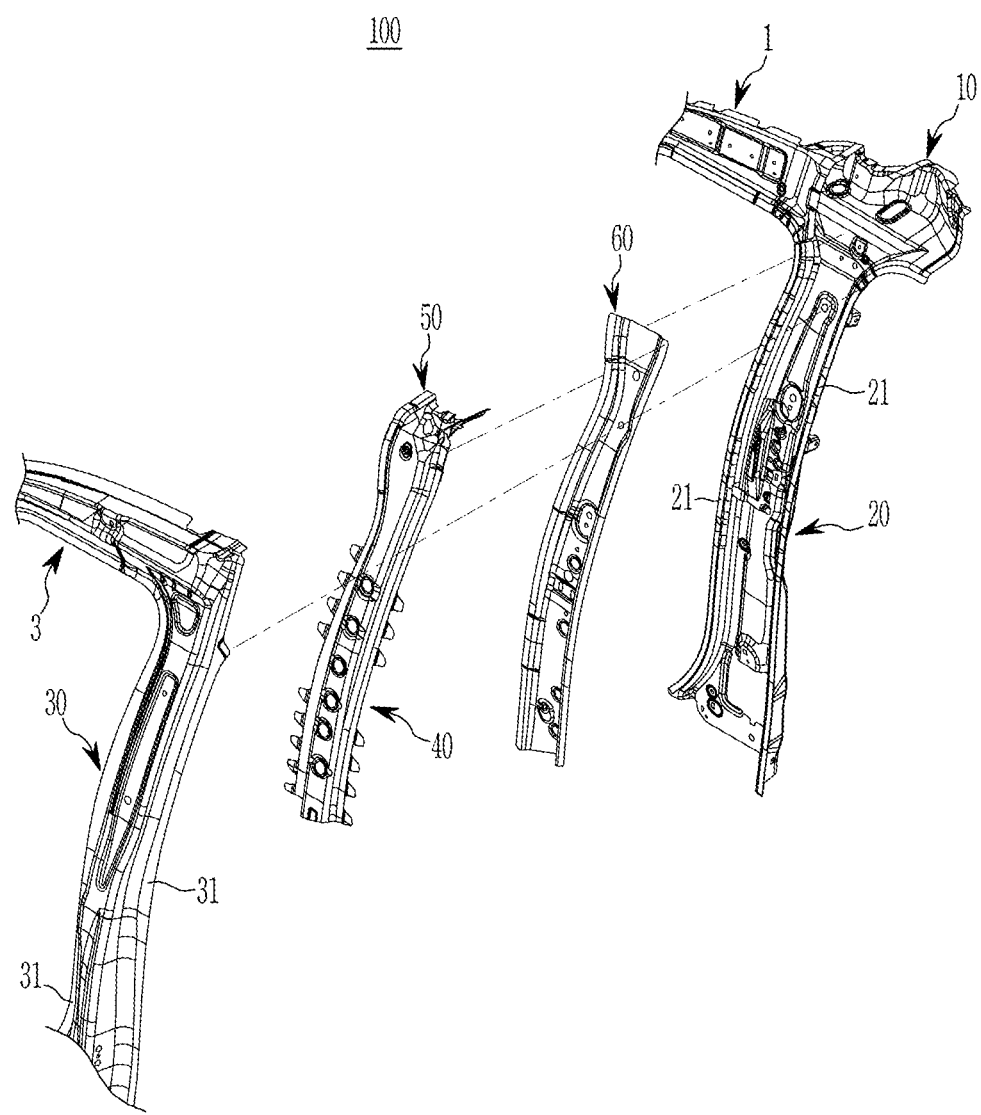
FIG. 2 is an exploded perspective view showing a center pillar structure according to various exemplary embodiments of the present invention.

FIG. 1 is a perspective view showing a center pillar structure according to various exemplary embodiments of the present invention, and FIG. 2 is an exploded perspective view showing a center pillar structure according to various exemplary embodiments of the present invention.

Referring to FIG. 1 and FIG. 2, a center pillar structure 100 according to various exemplary embodiments of the present invention supports a front door and a rear door, and supports side surfaces of an opened vehicle body, for example, the center pillar structure 100 may be applied to a multi-purpose vehicle (MPV) with a sliding door.

Here, the center pillar structure 100 of the MPV vehicle has an upper end portion structure of an "L" shape to avoid interference with a sliding door rail. The present center pillar structure 100 can transmit load acting on a side of the vehicle body from the front and rear directions of the vehicle to the up and down directions.

The center pillar structure 100 is connected to a roof side 5 including a side inner (1, also referred to as a roof side inner in the industry) and a front pillar reinforcement outer 3 and the upper portion thereof, and the lower portion connected to a side sill 7.

In the industry, the width direction of the vehicle is called L direction, the front and rear direction of the vehicle body is called the T direction, and the height direction of the vehicle body is called H direction thereof. However, in various exemplary embodiments of the present invention, instead of setting the LTH direction as described above as the reference direction, the constituent elements in the following will be described by setting the width direction of the vehicle, the vehicle body front and rear direction and the up and down direction thereof.

Figure 3:
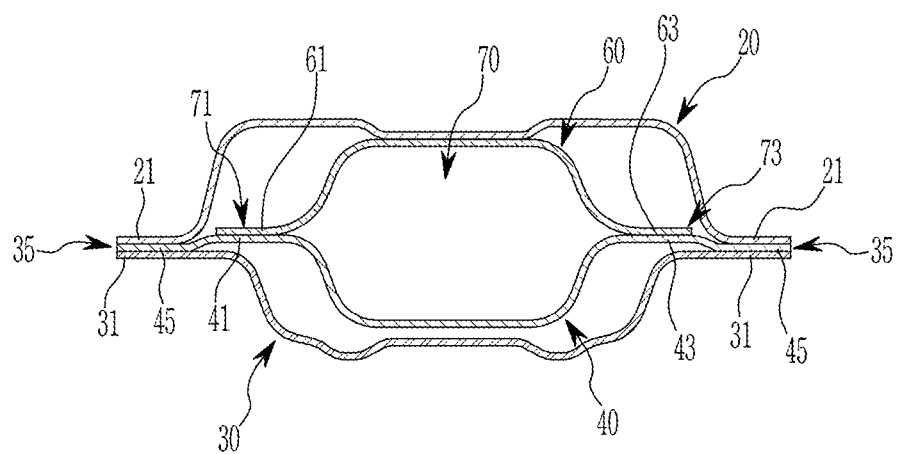
FIG. 3 is a cross-sectional view along line A-A in FIG. 1.

FIG. 3 is a cross-sectional view along line A-A in FIG. 1.

Referring to FIG. 1 to FIG. 3, the center pillar structure 100 basically includes a center pillar inner upper 10, a center pillar inner 20, a center pillar reinforcement outer 30, a center pillar reinforcement 40, a center pillar reinforcement upper 50, and a seat belt reinforcement 60.

In the above, the center pillar inner upper 10 reinforces the connection to the roof rail, and is connected to the rear end portion of the side inner 1.

The center pillar inner 20 is connected to the lower portion of the center pillar inner upper 10. The center pillar inner 20 includes a first flange 21 formed along the up and down directions on the front and rear sides.

The center pillar reinforcement outer 30 is connected to the rear end portion of the front pillar reinforcement outer 3, and is connected to the center pillar inner 20.

The center pillar reinforcement outer 30 includes a second flange 31 formed along the up and down directions on the front and rear sides to be connected to the first flange 21 of the center pillar inner 20.

As the center pillar inner 20 and the center pillar reinforcement outer 30 are joined to each other through the first and second flanges 21, and 31, a continuous closed section is formed on the inner side in up and down directions. The first and second flanges 21, and 31 of the center pillar inner 20 and the center pillar reinforcement outer 30 are joined to each other to form flange combined portions 35 on front and rear sides.

Figure 4:
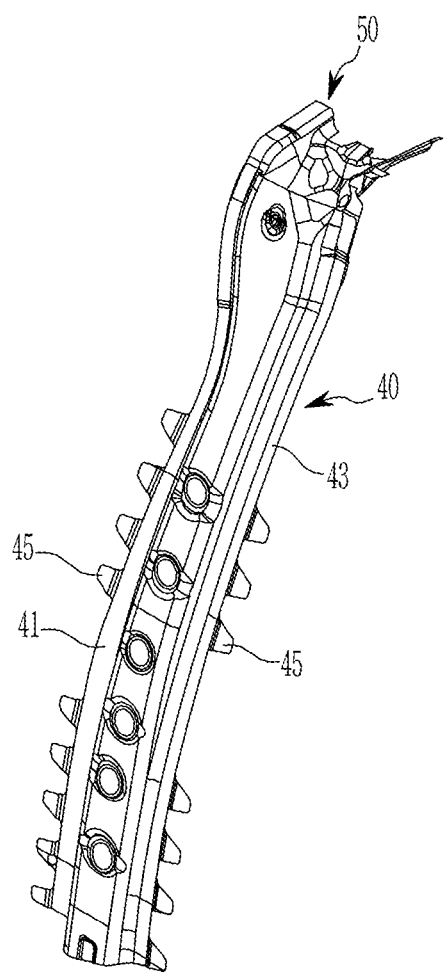
FIG. 4 is a drawing showing a center pillar reinforcement applied to a center pillar structure according to various exemplary embodiments of the present invention.

FIG. 4 is a drawing showing a center pillar reinforcement applied to a center pillar structure according to various exemplary embodiments of the present invention.

Referring to FIG. 1, FIG. 2, FIG. 3, and FIG. 4, the center pillar reinforcement 40 is a main reinforcement member of the center pillar, and is mounted along the up and down directions inside between the center pillar inner 20 and the center pillar reinforcement outer 30.

The center pillar reinforcement 40 has, for example, a hat-shaped cross-section and is joined between the front/rear flange combined portions 35 of the center pillar inner 20 and the center pillar reinforcement outer 30.

The front and rear edge portions of the center pillar reinforcement 40 are joined between the first and second flanges 21, and 31 of the center pillar inner 20 and the center pillar reinforcement outer 30.

The center pillar reinforcement 40, as shown in FIG. 4, includes a front flange 41 formed along the up and down directions at the front edge portion and a rear flange 43 formed along the up and down directions at the rear edge portion.

The center pillar reinforcement 40 further includes a flange rib 45 which is spaced in the up and down directions on the front flange 41 and rear flange 43, and integrally protruded along the front and rear directions.

The flange rib 45, as shown in FIG. 3, are joined between the front/rear flange combined portion 35 of the center pillar inner 20 and the center pillar reinforcement outer 30. That is, the flange rib 45 is coupled between the first and second flanges 21 and 31 of the center pillar inner 20 and the center pillar reinforcement outer 30.

In the above, the center pillar reinforcement upper 50 is a portion which is connected to the roof rail of the roof, and is connected to the upper portion of the center pillar reinforcement 40, and is combined with the center pillar inner upper 10.

Figure 5:
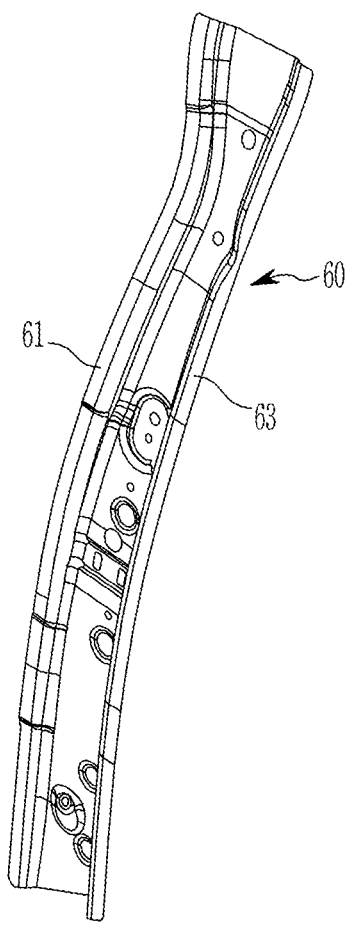
FIG. 5 is a drawing showing a seat belt reinforcement applied to a center pillar structure according to various exemplary embodiments of the present invention.

FIG. 5 is a drawing showing a seat belt reinforcement applied to a center pillar structure according to various exemplary embodiments of the present invention.

As shown in FIG. 1 and FIG. 5, the seat belt reinforcement 60 reinforces the local strength of the seat belt mounted to the center pillar inner 20, and is a shape corresponding to the center pillar reinforcement 40, and is formed in a ha 'T'-shaped cross-section.

The seat belt reinforcement 60 is combined with the center pillar reinforcement 40 along the up and down directions. The present seat belt reinforcement 60 includes a front flange 61 formed along the up and down directions at the front edge portion and a rear flange 63 formed along the up and down directions at the rear edge portion.

Figure 6:
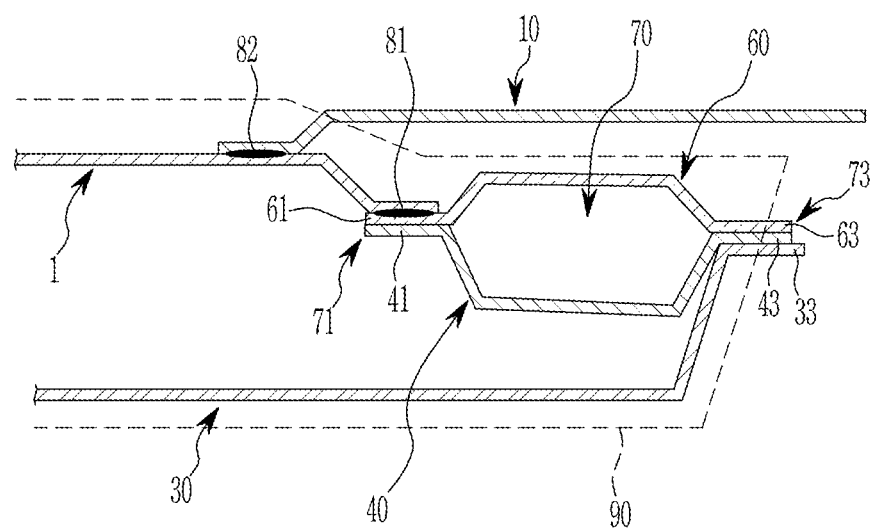
FIG. 6 is a cross-sectional view along line B-B in FIG. 1.

FIG. 6 is a cross-sectional view along line B-B in FIG. 1.

Referring to FIG. 3 and FIG. 6, the seat belt reinforcement 60 is joined along the up and down directions to the front flange 41 and rear flange 43 of the center pillar reinforcement 40 through front flange 61 and rear flange 63. For example, it may be welded continuously.

Accordingly, the joint of the center pillar reinforcement 40 and the seat belt reinforcement 60 joined as described above forms an inner closed section 70 on the inner side between the center pillar inner 20 and the center pillar reinforcement outer 30.

The inner closed section 70 includes a front welding flange portion 71 in which the front flange 41 of the center pillar reinforcement 40 and the front flange 61 of the seat belt reinforcement 60 are continuously welded along the up and down directions, and a rear welding flange portion 73 in which the rear flange 43 of the center pillar reinforcement 40 and the rear flange 63 of the seat belt reinforcement 60 are continuously welded along the up and down directions.

Referring to FIG. 6, the rear end portion of the side inner 1 is welded with the front welding flange portion 71 of the inner closed section 70 on the upper end side of the inner closed section 70.

The rear end portion of the side inner 1 is welded to the front flange 61 of the seat belt reinforcement 60. That is, the side inner 1 is coupled to the front flange 61 of the seat belt reinforcement 60 through the first welding portion 81.

The center pillar inner upper 10 is welded to the side inner 1 in front of the first welding portion 81. That is, the center pillar inner upper 10 is coupled to the side inner 1 through the second welding portion 82 in front of the first welding portion 81.

The center pillar reinforcement outer 30 is welded with the rear welding flange portion 73 of the inner closed section 70 at the upper end portion of the inner closed section 70.

The center pillar reinforcement outer 30 is coupled to the rear flange 43 of the center pillar reinforcement 40 through a connection flange 33 so that the inner closed section 70 is provided on an inside thereof.

The center pillar reinforcement outer 30 is welded to the rear welding flange portion 73 of the inner closed section 70 at the upper end portion of the inner closed section 70. Thus, the center pillar reinforcement outer 30 and the side inner 1 can form a main closed section 90 including the inner closed section 70 at the upper end portion of the center pillar.

Figure 7:
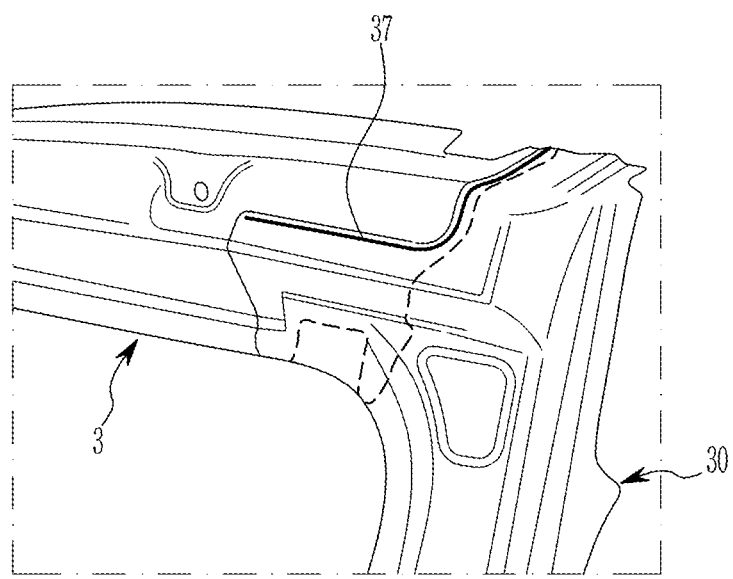
FIG. 7 is a drawing showing the combined structure of a front pillar reinforcement outer and a center pillar reinforcement outer applied to a center pillar structure according to various exemplary embodiments of the present invention.

FIG. 7 is a drawing showing the combined structure of a front pillar reinforcement outer and a center pillar reinforcement outer applied to a center pillar structure according to various exemplary embodiments of the present invention.

Referring to FIG. 7, the upper end portion of the center pillar reinforcement outer 30 is welded to the rear end portion of the front pillar reinforcement outer 3 through a connection end portion 37 formed with "L"-shape.

In the center pillar structure 100 according to various exemplary embodiments of the present invention as described so far, between the center pillar inner 20 and the center pillar reinforcement outer 30, the center pillar reinforcement 40 and seat belt reinforcement 60 with independent matching flanges are welded to form the continuous inner closed section 70 along the up and down directions.

Furthermore, in various exemplary embodiments of the present invention, the rear end portion of the side inner 1 is welded to the front welding flange portion 71 of the center pillar reinforcement 40 and seat belt reinforcement 60, and in front of the welding portion, the center pillar inner upper 10 is welded to the side inner 1 to form a double welding connection structure.

Furthermore, in various exemplary embodiments of the present invention, the rear welding flange portion 73 of the inner closed section 70 and the center pillar reinforcement outer 30 are welded, and the side inner 1 and the center pillar inner upper 10 form the main closed section 90 including the inner closed section 70.

Therefore, in various exemplary embodiments of the present invention, since it includes a double closed cross-section of inner closed section 70 and main closed section 90, it is possible to increase the strength to support the load transferred from the front and rear directions of the vehicle to the up and down directions.

Also, in various exemplary embodiments of the present invention, since it includes a double closed cross-section of inner closed section 70 and main closed section 90, the connection between the side inner 1 and the center pillar reinforcement 40 may be secured.

Also, in various exemplary embodiments of the present invention, by welding the center pillar reinforcement outer 30 to the rear welding flange portion 73 of the inner closed section 70, the connection between the side inner 1 and the center pillar reinforcement outer 30 through the inner closed section 70 may be secured.

Also, in various exemplary embodiments of the present invention, by welding the upper end portion of the center pillar reinforcement outer 30 to the rear end portion of the front pillar reinforcement outer 3 through the "L"-shaped connection end portion 37, the welding cross-section between the front pillar reinforcement outer 3 and the center pillar reinforcement outer 30 is increased.

Also, in various exemplary embodiments of the present invention, it is possible to reinforce the strength of the center pillar and reduce deformation of elements according to the small overlap collision of the vehicle and is possible to improve the collision performance, and reduce the weight and cost by reducing the number of parts.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A center pillar structure comprising:
    a center pillar inner upper connected to a side inner;
    a center pillar inner connected to the center pillar inner upper in up and down directions;
    a center pillar reinforcement outer connected to a front pillar reinforcement outer and connected to the center pillar inner along the up and down directions;
    a center pillar reinforcement disposed along the up and down directions between the center pillar inner and the center pillar reinforcement outer, and coupled between front/rear flange combined portions of the center pillar inner and the center pillar reinforcement outer; and
    a seat belt reinforcement shaped corresponding to the center pillar reinforcement, and connected to the center pillar reinforcement to form an inner closed section with the center pillar reinforcement along the up and down directions.

2. The center pillar structure of claim 1, wherein the inner closed section includes a space formed by:
    a front welding flange portion in which a front flange of the center pillar reinforcement and a front flange of the seat belt reinforcement are welded to each other along the up and down directions; and
    a rear welding flange portion in which a rear flange of the center pillar reinforcement and a rear flange of the seat belt reinforcement are welded to each other along the up and down directions.

3. The center pillar structure of claim 2, wherein the front welding flange portion and the rear welding flange portion are disposed between the center pillar inner and the center pillar reinforcement outer.

4. The center pillar structure of claim 2, wherein the center pillar reinforcement includes flange ribs formed to be integrally protruded by being separated from the front flange of the center pillar reinforcement and the rear flange of the center pillar reinforcement in the up and down directions, and joined between the center pillar inner and the front/rear flange combined portion of the center pillar reinforcement outer.

5. The center pillar structure of claim 2, wherein a rear end portion of the side inner is welded with the front welding flange portion of an upper end portion of the inner closed section.

6. The center pillar structure of claim 5, wherein the rear end portion of the side inner is welded with the front flange of the seat belt reinforcement.

7. The center pillar structure of claim 6, wherein the rear end portion of the side inner is welded with the front flange of the center pillar reinforcement.

8. The center pillar structure of claim 5, wherein the center pillar inner upper is welded in a front of a welding portion of the side inner and the front welding flange portion.

9. The center pillar structure of claim 2, wherein the center pillar reinforcement outer is welded to the rear welding flange portion at an upper end portion of the inner closed section.

10. The center pillar structure of claim 9, wherein the center pillar reinforcement outer is welded to the rear flange of the center pillar reinforcement through a connection flange of the center pillar reinforcement outer so that the inner closed section is provided inside the center pillar reinforcement outer.

11. The center pillar structure of claim 10, wherein the center pillar reinforcement outer and the side inner form a closed section including the inner closed section.

12. The center pillar structure of claim 11, wherein the closed section includes:
    the inner closed section formed by the seat belt reinforcement and the center pillar reinforcement; and an additional closed section formed by the side inner, the center pillar reinforcement, and the center pillar reinforcement outer.

13. The center pillar structure of claim 9, wherein an upper portion of the center pillar reinforcement outer is welded to a rear end portion of the front pillar reinforcement outer through a "L" shape connection end portion.

14. The center pillar structure of claim 1, further including a center pillar reinforcement upper connected to an upper portion of the center pillar reinforcement and coupled with the center pillar inner upper.

* * * * *